(No Model.)  H. A. HARVEY.  3 Sheets—Sheet 1.
NUT AND BOLT.

No. 273,731.   Patented Mar. 13, 1883.

Witnesses:
Asa Farr.
M. L. Adams

Inventor:
H. A. Harvey
Per Edw. E. Quinby
Atty.

(No Model.)

H. A. HARVEY.
NUT AND BOLT.

No. 273,731. Patented Mar. 13, 1883.

(No Model.)  H. A. HARVEY.  3 Sheets—Sheet 3.
NUT AND BOLT.

No. 273,731.  Patented Mar. 13, 1883.

Witnesses.
M. L. Adams.
Asa Farr.

Inventor.
H. A. Harvey.
Per Edw. E. Quimby
Atty.

UNITED STATES PATENT OFFICE.

HAYWARD A. HARVEY, OF ORANGE, NEW JERSEY.

NUT AND BOLT.

SPECIFICATION forming part of Letters Patent No. 273,731, dated March 13, 1883.

Application filed February 2, 1883. (No model.)

*To all whom it may concern:*

Be it known that I, HAYWARD A. HARVEY, of Orange, New Jersey, have invented a certain Improvement in Nuts and Bolts, of which the following is a specification.

My invention relates to the combination of a screw-bolt with a nut having a thread of uniform pitch and depth, which thread is truncated in one portion of the nut and merges gradually into a V-thread or into a more narrow truncated thread in the remaining portion of the nut.

Figure 2:
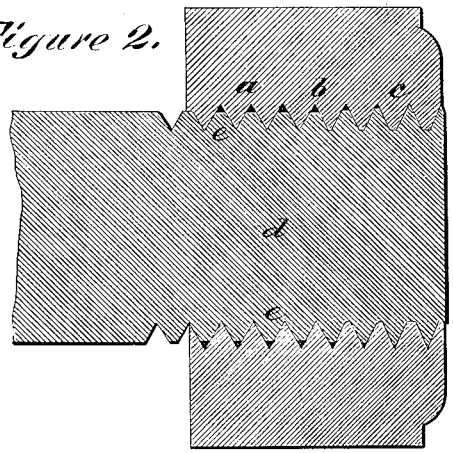

In Letters Patent of the United States No. 224,591, dated February 17, 1880, granted to me for an improvement in lock-nuts, I described what I have called a "spiral-wedge" nut having formed in it a truncated thread which gradually merges into a V-thread, the grooves of its truncated thread being progressively deepened for the purpose of providing space to receive the metal of the bolt-thread, which, by the influence of the truncated thread, when the nut is applied, is forced laterally outward. In Fig. 2 of the drawings of the said patent there is shown a partially-finished spiral-wedge nut which is ready for the final operation of having the grooves of its truncated thread deepened. It has a thread of uniform pitch, which at one end is truncated, and which, by having its convolutions progressively narrowed at their apices, gradually merges into a V-thread; but the thread is of uniform depth. This unfinished nut of my former patent is applicable to my present invention, which consists in the combination of a spiral-wedge nut having a thread of uniform depth and pitch with a screw-bolt the thread of which has the same pitch as that of the nut, but is in a prescribed degree of less area in solid cross-section than the transverse area of the grooves between the convolutions of the engaging or V thread of the nut, and is of the same or nearly the same area in solid cross-section as the transverse area of the grooves between the wider truncated convolutions of the nut-thread.

Figure 1:
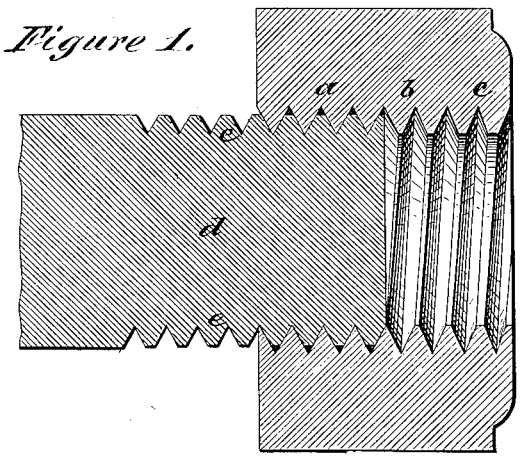
Figure 3:
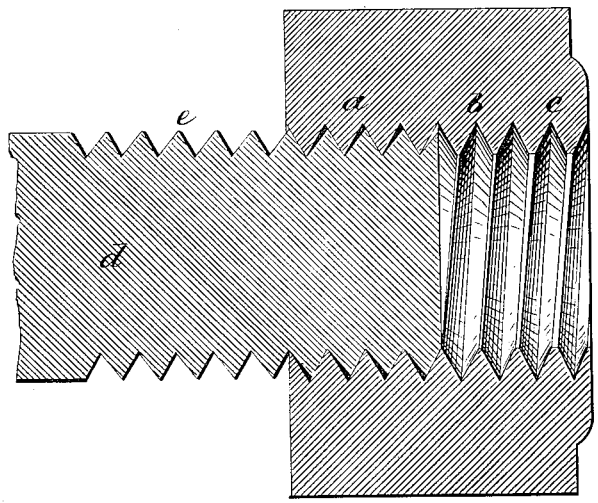
Figure 4:
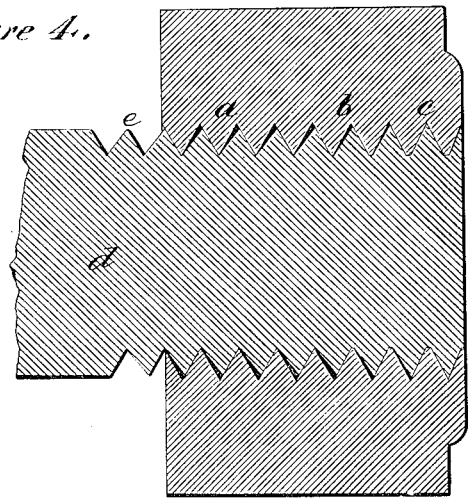
Figure 5:
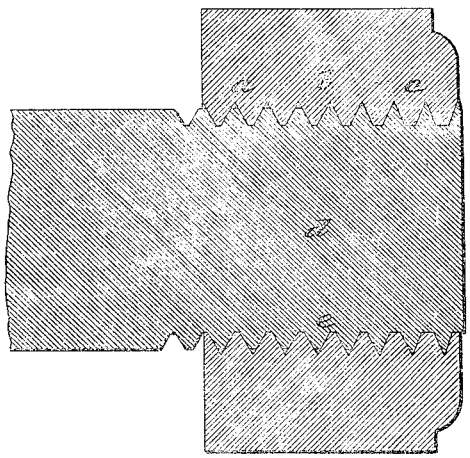

The accompanying drawings, illustrating a nut and bolt embodying my invention, are as follows:

Figure 1 is an axial section of a nut and a portion of a bolt, showing the bolt partially entered into the nut. Fig. 2 is a similar section, showing the bolt fully entered into the nut. Fig. 3 is an axial section of a nut and a portion of a bolt having a V-thread one of the sides of which is less steeply inclined than the other, showing such bolt partially entered into the nut. Fig. 4 is a section similar to Fig. 3, except that it represents the bolt as fully entered into the nut. Fig. 5 is an axial section of a nut and portion of a bolt, showing the application of my invention to a bolt having a truncated thread with a flat-bottomed groove.

The section $a$ of the nut is provided with what I call the "engaging threads," which may be of V shape or of any other suitable shape, so that this section of the nut will fit the bolt with comparative looseness. The convolutions of the thread of the middle section, $b$, of the nut, by the progressive widening of their apices, are gradually merged into the truncated thread $c$. The bolt $d$ is provided with a thread, $e$, the convolutions of which are of less area in solid cross-section than the transverse area of the grooves between the convolutions of the engaging thread $a$ of the nut. This difference in the solid cross-area of the bolt-thread may be effected as shown in Figs. 1 and 2 of the drawings, in which, as will be seen, the bases of the convolutions of the bolt-thread, prior to the application of the nut, are of the same width as the width of the spaces between the apices of the convolutions of the V-thread of the nut; but the apices of the convolutions of the bolt-thread are flattened, making what is known as a "truncated" thread. There is thus left an unoccupied space between the apex of the bolt-thread and the bottom of the V-groove of the engaging thread $a$ of the nut.

Another mode of making the area of the bolt-thread in solid cross-section less than the transverse area of the grooves between the V-threads of the nut, which may be adopted without departing from my invention, is illustrated in Figs. 3 and 4, in which, as will be seen, one side of the bolt-thread has the same angle as the side of the V-thread of the nut, while the other side of the bolt-thread is less steeply inclined, thus leaving an unoccupied triangular space bounded by the less steeply inclined side of the bolt-thread and a small portion of one side and the whole of the other side of the V-thread of the nut. As the nut is applied to the bolt the bases of the bolt-thread are progressively compressed by and exert compression upon the spiral-wedge section $b$ of the nut-thread, and the metal of both threads is thus displaced until, when the nut is fully applied, as shown in Fig. 2, the threads are so far transformed as to fill or nearly fill the grooves in which they are respectively deposited.

Fig. 5 illustrates the manner in which my invention may be employed in connection with a bolt having a truncated thread with flat-bottomed grooves between its convolutions.

Referring to the structures shown in Figs. 1, 2, 3, and 4 of the drawings, it will be seen that the engaging-threads $a$ of the nut are pointed at their apices and have V-shaped grooves.

In the modification illustrated in Fig. 5 the engaging threads of the nut, instead of being V-threads, are truncated. The other portions of the nut-thread are therefore made correspondingly thicker in solid cross-section as compared with the threads of the nuts shown in Figs. 1, 2, 3, and 4.

In either of these modes of employing my invention there is a mutual abrasion of the opposed surfaces of the wider truncated thread of the nut and the thread of the bolt, with the result that the nut acquires such a firm hold of the bolt that no jarring will release it, and it can only be unscrewed from the bolt by the application of a torsional strain substantially equal to that employed in screwing it on the bolt in the first instance.

What I claim as my invention is—

The nut and bolt mechanism herein shown and described, which consists of a nut having formed in it a screw-thread of uniform depth and pitch, the convolutions of which at one end, $c$, are truncated, while in the middle section, $b$, of the nut, by the progressive narrowing of the apices of the convolutions, the thread gradually merges into either a V-thread or into a relatively narrower truncated thread, a suitable number of convolutions of which, $a$, are employed as engaging threads for a screw-bolt, the thread of which is, in a prescribed degree, of less area in solid cross-section than the transverse area of the grooves between the engaging threads $a$ of the nut, and is of the same or nearly the same area in solid cross-section as the transverse area of the grooves between the truncated convolutions $c$ of the nut-thread.

H. A. HARVEY.

Witnesses:
M. L. ADAMS,
ASA FARR.